3,451,784
FLUIDIZED BED REACTOR
Salvatore A. Guerrieri, Rowayton, Conn., assignor to The Lummus Company, New York, N.Y., a corporation of Delaware
Filed Oct. 28, 1965, Ser. No. 505,555
Int. Cl. B01t 1/14, 1/00
U.S. Cl. 23—284                                7 Claims

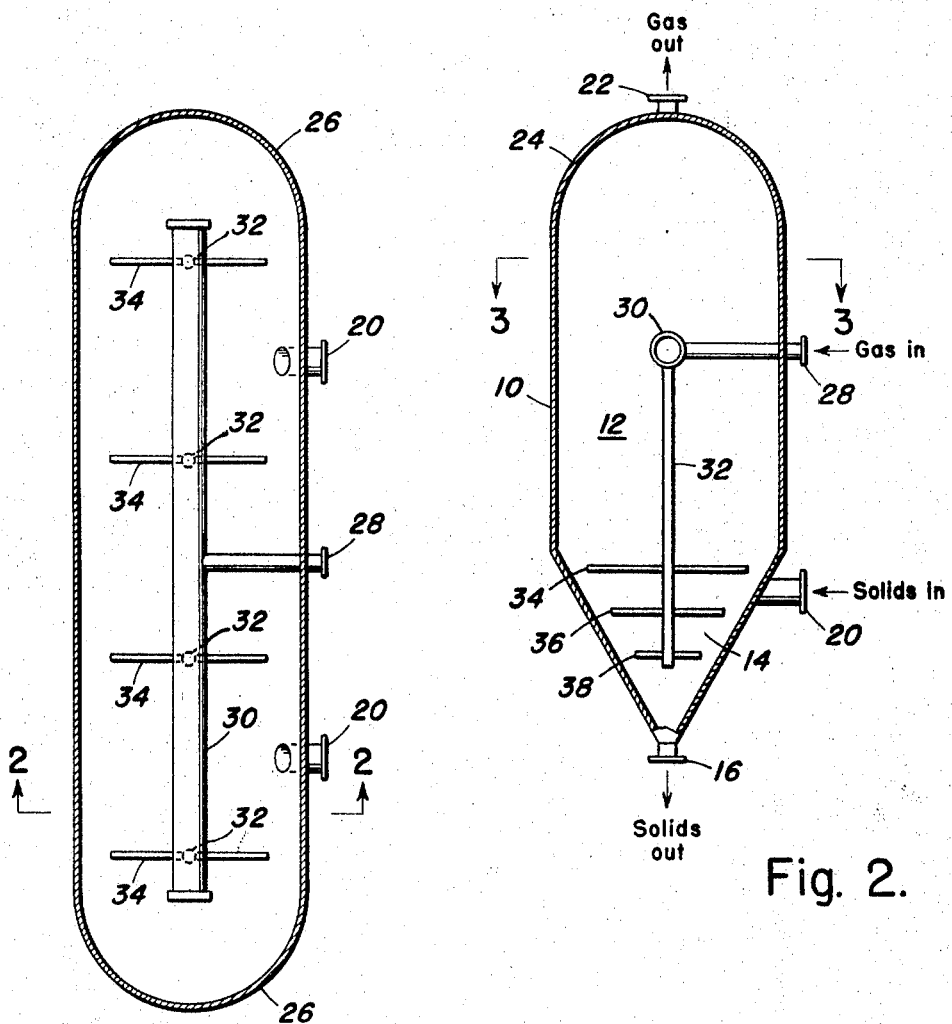
Fig. 2.
Fig. 3.
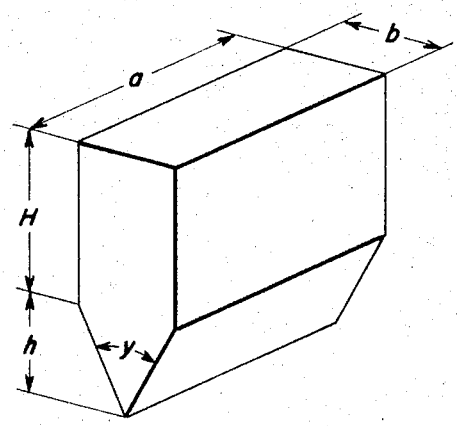
Fig. 1.
INVENTOR
Salvatore A. Guerrieri
BY *Marn & Jangarathis*
ATTORNEYS United States Patent Office 3,451,784
Patented June 24, 1969

ABSTRACT OF THE DISCLOSURE

A fluidized bed reactor having an upper portion and a lower portion, the upper and lower portion having equal lengths; considered from top to bottom, the width of the upper portion being substantially constant and the width of the lower portion decreasing; the vertical cross-section of the lower portion in a plane parallel to the width thereof being substantially triangular. In general, the upper portion of the vessel is in the form of a rectangular parallelepiped and the lower portion in the form of a triangular prism sharing a common base. Thus the volume of the lower portion of the vessel may be varied by varying its height while maintaining constant the horizontal cross-sectional area of the upper portion whereby the residence time of solids in the lower portion may be varied without changing gas flow rate within the reactor.

---

This invention relates generally to a vessel wherein the volume contained in the bottom closure area is independent of the cross-sectional area of the vessel. More particularly, the invention relates to a fluidized bed reactor wherein the residence time of solids in the bottom, restricted portion of the bed is readily controllable.

Fluidized bed reactors are often cylindrically shaped vessels having a conical bottom portion, a solids outlet at the bottom, a gas outlet at or near the top and solid and gas inlets at appropriate levels, means being provided for the proper distribution of the incoming gas.

In such reactors, the volume of the conical bottom portion is invariable, once the reactor diameter and the cone angle are determined. The diameter of the vessel is fixed by the flow rate of fluidizing gas and the limits on gas velocity within the reactor. The angle of the cone must, of course, be at least equal to or greater than the natural angle of repose of the solids. These limitations on reactor design create many problems, particularly in instances where short residence time of the solids is required. Thus, since reactor diameter and cone volume, depending on gas velocity, are invariant, the cone volume may be much too large for the desired solids residence time.

To meet the requirement of short distance time in such vessels, it may be necessary to carry the level of the solids only to the top of the cone. At least two adverse effects are encountered by this. Uniform gas distribution across the bed is difficult if not impossible to achieve, and gas residence time varies appreciably. The smallest fraction of gas is introduced at the bottom of the cone, where the cross-section is least, but this fraction has the longest contact time. The largest fraction of gas is introduced near the top of the cone but this has the least contact time. This situation is not conducive to good results.

It is thus a general object of the present invention to provide a fluidized bed reactor which overcomes the foregoing design and operating problems.

Another object of the invention is to provide a fluidized bed reactor wherein the bottom closure volume can be varied independently of the vessel's cross-sectional area.

Yet another object of the invention is to provide a fluidized bed reactor wherein the volume of the bottom, restricted portion is generally directly proportional to reactor width, and independent of the vessel's cross-sectional area.

Still another object of the invention is to provide a fluidized bed reactor wherein the solids capacity of the bottom closure volume is minimized as compared to the capacity of the straight-walled portion of the vessel, so as to provide a solids level above the bottom section where substantially uniform gas contact time is obtainable.

Various other objects and advantages of the present invention will become clear from the following description of an embodiment thereof, and the novel features will be particularly pointed out in connection with the appended claims.

In essence, the present invention accomplishes the foregoing objects by providing a reactor having a generally rectangular parallelepiped upper portion and a generally triangularly shaped prismatic lower portion sharing a common base. The volume of the bottom section can be varied by changing the width and length of the reactor, keeping the total area of the bed constant and keeping the apex angle of the prism constant. In this manner, the volume of the bottom portion and, hence, the residence time of solids in the bottom portion, can be controlled without affecting the overall characteristics of the bed, i.e. gas flow rate and velocity. Thus, the reactor has an upper portion and a lower portion, the horizontal cross-sectional area of the upper portion being substantially constant from top to bottom and the horizontal cross-sectional area of the lower portion decreasing from the top to the bottom with the vertical cross-section of the lower portion of the vessel in a plane parallel to the width thereof having a triangular shape.

Understanding of the invention will be facilitated by referring to the description and mathematical analysis set forth below, taken in conjunction with the accompanying drawings, in which:

FIGURE 1 is a perspective view of a very simple embodiment of the invention and showing the dimensions used in the analysis hereinbelow;

FIGURE 2 is a cross-sectional elevation, taken along line II—II of FIGURE 3; and FIGURE 3 is a cross-sectional plan view, taken along line III—III of FIGURE 2.

The principle of the invention will be more readily understood by the following mathematical analysis, which applies to a vessel of rectangular cross-section as shown in its simplest form in FIGURE 1.

$a$=the length of the vessel
$b$=the width of the vessel
$h$=the height of the triangularly prismatic-shaped bottom portion
$y$=the apex angle of the bottom portion
$H$=the height of the straight shell
Volume of the lower portion=$a(bh/2)$
Substituting A for $ab$, the volume of the lower portion =$Ah/2$. Since $h=b/(2 \cot (y/2))$ the volume of the lower portion $=Ab/(4 \cot (y/2))$. A is fixed by the gas flow rate and allowable gas velocity $y$ is fixed by the angle of repose of the solids; thus the volume of the lower portion is directly related to $b$ FIGURE 1 represents the simplest construction utilizing only flat plates to form the enclosure but such construction is not acceptable for use at any pressure other than atmospheric pressure. For higher or lower pressures, either the plates must be reinforced or the shape of the vessel should be modified. Such modifications are obvious to those skilled in the art. Following are a few examples:

(1) Similar to FIGURE 1, but enclose the top by a semi-cylinder.
(2) Similar to (1), but form the ends of semi-cylinders, semi-cones and quarter-spheres.
(3) Similar to FIGURE 1, but use a flat elliptical cross-section and corresponding shapes for the top head, ends and the V-section.

Clearly, the number of possible variations is almost limitless. In any such deviations from the model of FIGURE 1, it is important that the cross-section of the vessel does not change materially from the basic rectangular section because otherwise the advantages of the rectangular cross-section are lost.

A simple illustration will further explain the invention. A rectangular fluidized bed reactor is 2 feet wide ($b$) by 4 feet long ($a$) and the height ($h$) of the bottom section is 2 feet. The tangent of one half the angle of the V is $\frac{1}{2}$.

$$A = ab = 8 \text{ square feet}$$

Therefore the volume of the lower portion is $$\frac{(2)(4)(2)}{(4)(1/2)} = 8 \text{ cubic feet}$$

This is considered too large for the required residence time. Since $a$ and $b$ can be varied as long as A remains constant, the dimensions are changed to $b=1$ foot and $a=8$ feet. Again, A=8 square feet and tan $y/2=\frac{1}{2}$, but the volume of the lower portion is $$\frac{(8)(1)}{(2)(1/2)} = 4 \text{ cubic feet}$$

Thus, the solids hold-up in the lower portion is reduced 50% by reducing the width 50%, but the gas velocity is unchanged since A is unchanged.

With reference to FIGURES 2 and 3, the reactor vessel 10 has a rectangular portion 12 and a V-shaped portion 14. Solids are removed through one or more outlets 16 at the bottom of the V portion (one shown). A plurality of solids inlets 20 and gas outlets 22 (one shown) are provided.

As shown, the reactor has a semi-cylinder top section 24 and end pieces 26, but these are merely optional design features having nothing to do with the invention.

Distribution of the fluidizing gas can be accomplished in a variety of ways, one of which is illustrated. An inlet main 28 feeds the gas to header 30 which passes the gas into a plurality of downwardly extending pipes 32. Pipes 32, in turn, supply perforated gas distribution pipes 34, 36, 38, which are arranged so as to generally conform to the triangular prismatic-shape of the bottom section. In the arrangement illustrated, it would be necessary to have appropriate supporting members (not shown) for the pipe assembly. Further, while reactor 10 is illustrated as a simple steel vessel, it will be understood that a refractory lining would be employed for carrying out high temperature reactions.

Alternatively, the sloping walls of the bottom section can be perforated, with gas supplied thereto from a chamber located therebelow. As noted above, the reactor may have other than a rectangular shape; the only requirement is that the dimensions be changeable without altering the cross-sectional area.

It should be apparent from the hereinabove teachings that the fluidized reactor of the invention is an improvement over the fluidized reactors having a conically shaped bottom portion heretofore employed in the art in that in the apparatus of the invention the volume of the lower portion of the vessel may be varied while maintaining the cross-sectional area of the upper portion of the vessel at a constant value. In this manner, the residence time of solids in the lower portion of the vessel may be varied without changing the gas velocity within the reaction.

Various other changes in the details, steps, materials and arrangements of parts, which have been herein described and illustrated in order to explain the nature of the invention, may be made by those skilled in the art within the principle and scope of the invention, as defined in the appended claims.

What is claimed is:
1. A fluidized bed reactor comprising:
a closed reactor vessel, said vessel having an upper portion and a lower portion, the upper and lower portion of said vessel having and equal lengths from the top to the bottom thereof, the upper portion of the vessel having a substantially constant width from the top to the bottom of said upper portion, the lower portion of said vessel having a decreasing width from the top to bottom thereof, the vertical cross-section of said lower portion in a plane parallel to the width of the vessel having a generally triangular shape whereby the horizontal cross sectional area of the upper portion of said vesvel is constant from top to bottom thereof and the horizontal cross-sectional area of the lower portion of the vessel decreases from the top to the bottom thereof;
means for feeding and discharging solids to and from said vessel;
means for feeding and discharged gases to and from said vessel, said gas feeding means including distribution means for uniformly distributing gas in the fluidized bed, said gas discharging means being located in the top portion of said vessel.

2. The fluidized bed reactor as claimed in claim 1 wherein the horizontal cross-section of the upper and lower portion of the vessel is of a general rectangular shape.

3. The fluidized bed reactor as claimed in claim 1 wherein the horizontal cross-section of the upper and lower portion of the vessel is of a generally rectangular shape having semi-circular end portions.

4. The fluidized bed reactor as claimed in claim 1 wherein the horizontal cross-section of the upper and lower portion of the vessel is of a generally elliptical shape.

5. The fluidized bed reactor as claimed in claim 1 wherein the width of the upper portion of the vessel is $b$, the length of the vessel is $a$, the horizontal cross-sectional area of the upper portion is $ab$, the apex angle of the generally triangular shaped cross-section is $y$ and the volume of the lower portion is $(ab)b/(4 \cot )y/2))$, the area $ab$ having a fixed value to provide a required gas velocity and flow rate for the vessel and the value $b$ having a value to provide a volume which produces a required residence time in the lower portion of the vessel.

6. A fluidized reactor as claimed in claim 1 wherein said vessel is comprised of two paralle end walls, said end walls having a generally rectangularly shaped upper portion and a substantially triangularly shaped lower portion having the apex at the bottom thereof, said rectangularly shaped portion defining end walls for the upper portion of the vessel and the triangularly shaped portion defining end walls for the lower portion of the vessel; two side walls integrally connected to the end walls, the upper portion of the side walls being substantially parallel to each other and having a generally rectangular shape, the lower portion of the side walls inwardly sloping toward each other in a direction from the top of the lower portion to the bottom thereof and said lower portion of the side walls having a generally rectangular shape.

7. A fluidized bed reactor as claimed in claim 1, wherein said gas feeding means comprise an inlet main, a header in fluid communication with said main, said header extending substantially the entire horizontal length of said vessel, a plurality of header pipes extending from said header into said bottom section and in fluid communication with said header, and a plurality of perforated, horizontal distribution pipes in fluid communication with each of said header pipes within said bottom section.

References Cited

UNITED STATES PATENTS

| | | | |
|---|---|---|---|
| 2,538,235 | 1/1951 | Coffey | 23—288.35 |
| 2,841,476 | 7/1958 | Dalton | 23—284 |

MORRIS Q. WOLK, *Primary Examiner.*

SIDNEY MARANTZ, *Assistant Examiner.*

U.S. Cl. X.R.

23—285